United States Patent
Knop

(10) Patent No.: US 12,286,013 B2
(45) Date of Patent: Apr. 29, 2025

(54) METHOD FOR ADJUSTING A VEHICLE MIRROR AND/OR A SCREEN, AND SYSTEM FOR CARRYING OUT THE METHOD

(71) Applicant: Bayerische Motoren Werke Aktiengesellschaft, Munich (DE)

(72) Inventor: Michel Knop, Affing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 245 days.

(21) Appl. No.: 17/910,738

(22) PCT Filed: Jan. 19, 2021

(86) PCT No.: PCT/EP2021/050991
§ 371 (c)(1),
(2) Date: Sep. 9, 2022

(87) PCT Pub. No.: WO2021/204431
PCT Pub. Date: Oct. 14, 2021

(65) Prior Publication Data
US 2023/0150361 A1    May 18, 2023

(30) Foreign Application Priority Data
Apr. 8, 2020   (DE) .................... 10 2020 109 760.3

(51) Int. Cl.
*B60K 35/00*    (2024.01)
*B60R 1/072*    (2006.01)
(Continued)

(52) U.S. Cl.
CPC ............ *B60K 35/00* (2013.01); *B60R 1/072* (2013.01); *B60K 35/22* (2024.01); *B60K 35/654* (2024.01); *B60K 2360/21* (2024.01)

(58) Field of Classification Search
None
See application file for complete search history.

(56) References Cited

U.S. PATENT DOCUMENTS

2004/0240706 A1    12/2004   Wallace et al.
2018/0096475 A1*   4/2018    Jemander ................ G01S 15/86
(Continued)

FOREIGN PATENT DOCUMENTS

| DE | 102015219237 A1 | 4/2017 |
| JP | 2017061216 A | 3/2017 |
| WO | 2012172492 A1 | 12/2012 |

OTHER PUBLICATIONS

International Search Report corresponding to International Patent Application No. PCT/EP2021/050991, dated Mar. 2, 2021 (4 pages).
(Continued)

*Primary Examiner* — Tamara L Weber
(74) *Attorney, Agent, or Firm* — Maginot, Moore & Beck LLP

(57) ABSTRACT

A method for adjusting at least one vehicle mirror and/or a screen includes capturing a head outline of a driver in relation to at least one vehicle geometry of the passenger compartment of the vehicle using a passenger-compartment camera of the vehicle. The position of the head of the driver is calculated using, at least in part, the captured head outline and calibration information with respect to the at least one vehicle geometry of the passenger compartment of the vehicle. The method also includes determining a target position of the at least one vehicle mirror and/or of the screen using, at least in part, the calculated head position. The method further includes activating an actuator of the at least one vehicle mirror and/or of the screen for the purpose of bringing about the determined target position of the vehicle mirror and/or of the screen.

20 Claims, 3 Drawing Sheets

(51) Int. Cl.
   *B60K 35/22* (2024.01)
   *B60K 35/65* (2024.01)

(56) References Cited

U.S. PATENT DOCUMENTS

| | | | |
|---|---|---|---|
| 2019/0272436 A1* | 9/2019 | Kuehnle | ................ G06Q 50/40 |
| 2020/0167951 A1* | 5/2020 | Nachtegall | ................ G06T 7/74 |
| 2020/0320318 A1* | 10/2020 | Ramaglia | ................ G06V 20/59 |
| 2021/0229601 A1* | 7/2021 | Hu | ......................... B60R 1/025 |

OTHER PUBLICATIONS

German Search Report corresponding to German Patent Application No. 10 2020 109 760.3, dated Nov. 19, 2020 (6 pages).

* cited by examiner

METHOD FOR ADJUSTING A VEHICLE MIRROR AND/OR A SCREEN, AND SYSTEM FOR CARRYING OUT THE METHOD

The present application is the U.S. national phase of PCT Application PCT/EP2021/050991 filed on Jan. 19, 2021, which claims priority of German patent application No. 102020109760.3 filed on Apr. 8, 2020, which is incorporated herein by reference in its entirety.

TECHNICAL FIELD

The disclosure relates to a method, and/or a system for adjusting at least one vehicle mirror and/or a screen, as well as a related computer-readable storage medium.

BACKGROUND

It is known from the prior art that the vehicle interior, security systems and also vehicle-assistance systems are adapted as regards their spatial arrangement to the respective needs of a driver. In this respect it is known, for instance, that driver-specific information is stored with the aid of a token or car key, so that when the driver-specific token or car key is read out the aforementioned systems or components are capable of being arranged individually.

This may concern, for instance, the seat adjustment, the orientation of vehicle mirrors, the selection of a radio program, etc. For this purpose, however, prior to beginning a journey it is necessary to collect various items of driver-specific information, to save them in a database, and also to make available appropriately different tokens or car keys.

Other systems are based on capturing driver-specific information before beginning a journey. In this respect, elaborate 3D camera systems are necessary, in order to capture, for instance, the direction of view of a driver. On the basis of data captured in such a manner, it is subsequently possible to orient the vehicle mirrors individually. In connection with 3D camera systems of such a type, high computing power is necessary, in order to be able to detect the correspondingly necessary information.

Accordingly, it is necessary to make additional computing capacities available in a vehicle for such applications.

SUMMARY

An object is therefore to make available a further-developed method, which can be carried out in straightforward manner, for adjusting at least one vehicle mirror and/or a screen.

In particular, one or more methods described herein are capable of being carried out with a comparatively low computing capacity. An additional aspect includes developing further the method for adjusting at least one vehicle mirror and/or a screen with regard to saving energy.

Moreover, it is an object to specify a system capable of carried disclosed methods. In particular, the system is to be based on the fact that the components and systems already present in a vehicle can also be utilized in connection with the adjustment of a vehicle mirror and/or of a screen. In particular, no additional fittings and/or systems are to be needed for the purpose of carrying out the method according to the invention.

This object is achieved by one or more methods and systems described herein, as well as via a corresponding computer-readable storage medium.

In particular, the object is achieved by a method for adjusting at least one vehicle mirror and/or a screen, including the following steps:
a) capturing a head outline of a driver in relation to at least one vehicle geometry of the passenger compartment of the vehicle by means of a passenger-compartment camera of the vehicle,
b) calculating the position of the head of the driver with the aid of the captured head outline and with the aid of calibration information with respect to the at least one vehicle geometry of the passenger compartment of the vehicle,
c) determining a target position of the at least one vehicle mirror and/or of the screen with the aid of the calculated head position,
d) activating an actuator of the at least one vehicle mirror and/or of the screen for the purpose of bringing about the determined target position of the vehicle mirror and/or of the screen.

The idea is based on using a passenger-compartment camera of the vehicle for the purpose of capturing a head outline of a driver. Passenger-compartment cameras are now integrated as standard in many vehicles.

In step a) the head outline of the driver is captured in relation to at least one vehicle geometry of the passenger compartment of the vehicle. The vehicle geometry of the passenger compartment of the vehicle is a fixed point and/or a fixed edge and/or an invariable geometry of the vehicle. In particular, this vehicle geometry is a geometry of the vehicle interior.

The invariable vehicle geometry may be, for instance, the portion of an A-pillar of the vehicle and/or the portion of a B-pillar of the vehicle and/or a portion of the C-pillar of the vehicle.

The head outline of the driver is captured in relation to this invariable vehicle geometry. In other words, both the head outline of the driver and the previously defined vehicle geometry of the passenger compartment of the vehicle are captured by means of the passenger-compartment camera, the arrangement of the head outline in relation to the at least one vehicle geometry being captured in the course of capture. In other words, both the head outline and the previously determined, invariable vehicle geometry of the passenger compartment of the vehicle have been projected on an image captured by the passenger-compartment camera of the vehicle.

In step b) a calculation of the position of the head of the driver is undertaken with the aid of the captured head outline and with the aid of calibration information with respect to the at least one vehicle geometry of the passenger compartment of the vehicle. With the aid of calibration information, the spacing of the position of the head of the driver in relation to the at least one vehicle geometry can be captured.

In particular with the aid of these data, the actual calculation of the position of the head of the driver in the passenger compartment of the vehicle is possible.

With the aid of the calculated position of the head of the driver, a determination of a target position of the at least one vehicle mirror and/or of the screen subsequently follows in step c). It is possible, for instance, that several reference values as regards a position of the head of the driver in the passenger compartment of the vehicle have been saved in a database. For each reference value in the database, the target position that a vehicle mirror, in particular at least one side mirror and/or a passenger-compartment mirror, and/or a screen has/have to assume has additionally been saved.

The side mirrors are, in particular, the exterior mirrors of a vehicle.

By way of target position of a vehicle mirror and/or of a screen, in particular the tilt angle of the vehicle mirror and/or of the screen in relation to at least one mounting axis of the vehicle mirror and/or of the screen is to be understood.

Data as regards the requisite angles of a vehicle mirror and/or of a screen in relation to a position of the head of the driver may have been saved in the database.

In step d) the activating is undertaken of an actuator of the at least one vehicle mirror and/or of the screen for the purpose of bringing about the determined target position of the vehicle mirror and/or of the screen. For this purpose, the actual position of the vehicle mirror and/or of the screen, for instance, is firstly captured. Subsequently it has to be ascertained how the actuator is to be activated in order to attain the previously determined target position of the vehicle mirror and/or of the screen.

It is known that small servomotors are provided in vehicle mirrors, in particular in side mirrors and/or in a passenger-compartment mirror, and/or in a screen.

In one embodiment of the method for adjusting at least one vehicle mirror and/or a screen described herein, a standard passenger-compartment camera of a vehicle is used for the purpose of capturing a head outline of the driver in step a). In particular, use is made of a passenger-compartment camera that is already provided in the vehicle. The passenger-compartment camera is preferentially a 2D camera or a fisheye camera. The evaluation of images produced by 2D cameras or fisheye cameras is significantly easier than the evaluation of 3D images that are generated with the aid of 3D cameras. The capturing of the head outline in accordance with step a) and also the calculating of the position of the head in accordance with step b) are therefore associated with a considerably lower necessary computing capacity.

In one embodiment, an elliptical shape is adapted to the captured head outline. Accordingly, in a computing step which is carried out between step a) and step b) the head outline captured by the passenger-compartment camera is reproduced in a simplified form. Accordingly, an edge section with regard to the captured head outline of the driver is firstly carried out, the edges subsequently being reproduced in the form of an ellipse.

In a further embodiment, in step a) the head outline of the driver is captured several times and a mean value of the captured head outlines of the driver is calculated. This calculated mean value of the captured head outlines is preferentially used subsequently in step b).

Moreover, it is possible that with regard to several captured head outlines an adapting of an elliptical shape to the captured head outlines is undertaken in each instance. Accordingly, it is possible to ascertain a mean value of the adapted elliptical shapes and to use this mean value in step b).

It is possible that in step c) a previously established mean value as regards a head length and a head width is drawn upon for the purpose of determining the target position of the vehicle mirror and/or of the screen. This is preferentially undertaken by taking the adapted elliptical shape(s) into account. By prior establishment of a mean value as regards a head length and a head width, step c) can be carried out in simplified manner. It is accordingly to be assumed that at least one vehicle mirror and/or a screen can be adjusted individually also when a mean value as regards a head length and a head width is drawn upon, provided that calculated information is available as regards the actual position of the head.

The decisive factor for the adjustment of a vehicle mirror and/or of a screen is accordingly not the actual head shape of the driver but rather the position of the head of the driver in the passenger compartment of the vehicle. Rather, the adjustment of a vehicle mirror and/or of a screen is undertaken on the basis of the height of the position of the head in the passenger compartment of the vehicle. It is known that the axis of the eye is located roughly halfway up the head. Proceeding from this information, the actual direction of view of a driver can be inferred accordingly. An accurate detecting or capturing of the eyes of a driver, and consequently an appropriate application of a complicated detection method, is therefore not necessary in order to be able to adjust at least one vehicle mirror and/or a screen of a vehicle.

For the purpose of improving and/or stabilizing the result, the outline of the upper body of the driver can be captured additionally in step a). These data can subsequently serve in step b) for calculating the position of the head of the driver.

In a further embodiment, it is possible that the spacing between the passenger-compartment camera and the at least one vehicle geometry is captured in a calibration step. The at least one vehicle geometry is preferentially a portion of the A-pillar of the vehicle and/or a portion of the B-pillar of the vehicle and/or a portion of the C-pillar of the vehicle. The spacing between the passenger-compartment camera and the at least one vehicle geometry is preferentially undertaken by means of a sensor, in particular by means of an infrared sensor. Alternatively, it is possible that the spacing is measured manually and entered into an arithmetic unit of the vehicle and stored in said unit.

In the case of the at least one vehicle geometry, it is a question of invariable points or portions of the passenger compartment of the vehicle that are capable of being captured clearly by the passenger-compartment camera.

If the spacing between the passenger-compartment camera and the at least one vehicle geometry is known, the spacing of the head outline of the driver—or, to be more exact, of the position of the head of the driver—from the passenger-compartment camera can be ascertained in the course of capturing a head outline of a driver in relation to the at least one vehicle geometry.

In other words, on the basis of the calibration step it is possible to make calibration information available with respect to the at least one vehicle geometry of the passenger compartment of the vehicle, so that depth information can be calculated from a captured two-dimensional image.

The calibration step may be carried out once upon completion of the vehicle. Such a calibration step is preferentially undertaken prior to delivery of a completed vehicle. In a further embodiment, it is possible that a calibration step is carried out before each adjustment of at least one vehicle mirror.

Surprisingly, it has become evident that for the purpose of adjusting at least one vehicle mirror and/or a screen the evaluation of information that is ascertained by means of a 2D camera or by means of a fisheye camera is sufficient to be able to determine a correct target position of the vehicle mirror and/or of the screen.

At least some embodiments of the method for adjusting at least one vehicle mirror and/or a screen described herein require far lower computing capacities than are known in connection with already known methods for adjusting vehicle mirrors.

A further aspect relates to a system for carrying out a method according to the invention. This system comprises:
  at least one passenger-compartment camera,
  at least one arithmetic unit and at least one data connection from the arithmetic unit to at least one actuator of a vehicle mirror and/or of a screen.

In a particular embodiment, the passenger-compartment camera is a 2D camera or a fisheye camera.

The actuator of a vehicle mirror may be the actuator of a side mirror and/or exterior mirror, and also the actuator of a passenger-compartment mirror. The actuators have been realized as standard in the form of small servomotors.

The passenger-compartment camera preferentially has an angle of view of 100°-120°, in particular of 110°-160°, in particular of 120°-130°.

In one embodiment, the at least one passenger-compartment camera is arranged on the central axis of a vehicle, in particular in the region of a vehicle roof or windshield root. These positions of the passenger-compartment camera appear to be particularly advantageous as regards the capture of a head outline of a driver and also additionally for the purpose of capturing an invariable vehicle geometry of the passenger compartment of the vehicle.

The passenger-compartment camera is preferentially a passenger-compartment camera that is already used in the vehicle for other applications.

The system may, in addition, exhibit a memory in which the mean value as regards a head length and a head width has been saved. Moreover, it is possible that the value of the spacing of the passenger-compartment camera from at least one vehicle geometry of the passenger compartment of the vehicle has been stored. In an embodiment, the memory is provided in the arithmetic unit.

In a further embodiment, the system includes a distance sensor, in particular an infrared sensor. The distance sensor, in particular the infrared sensor, serves, in particular, for determining the spacing between the passenger-compartment camera and the at least one vehicle geometry.

In connection with the system for adjusting at least one vehicle mirror and/or a screen, the same advantages arise as have already been described in connection with the method discussed above.

A further aspect relates to a computer-readable storage medium which contains instructions that cause at least one arithmetic unit, in particular an on-board computer of a vehicle, to implement a method for adjusting at least one vehicle mirror and/or a screen as previously described.

The above-described features and advantages, as well as others, will become more readily apparent to those of ordinary in the art by reference to the following detailed description and accompanying drawing.

DETAILED DESCRIPTION

Figure 1:
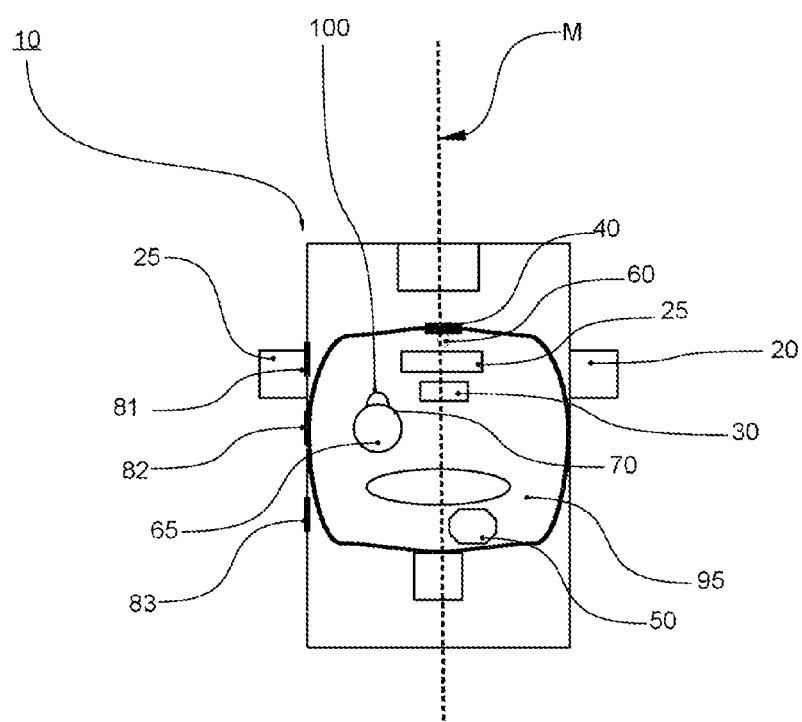
FIG. 1 shows a schematic representation of a plan view of a vehicle.

In the following description, the same reference numerals will be used for identical parts and parts acting identically.

FIG. 1 shows a schematic representation of a plan view of a vehicle 10 which includes a system configured to carry out a method for adjusting at least one vehicle mirror and/or a screen.

Accordingly, the side mirrors 20, which may also be designated as exterior mirrors, and also the interior mirror 25 can be adjusted by means of a method discussed further below. Moreover, it is possible that the screen 30 which is likewise represented can be adjusted with the aid of the method discussed further below.

The system includes at least one passenger-compartment camera 40. The passenger-compartment camera 40 is also used for other applications in the vehicle. The passenger-compartment camera 40 is a 2D camera or a fisheye camera.

Moreover, the system exhibits an arithmetic unit 50. The arithmetic unit 50 may, for instance, have been designed to be integrated into the on-board computer of the vehicle 10. A data connection (not represented) is provided between the arithmetic unit 50 and the actuators of the mirrors 20 and 25 and also to the screen 30.

The arrangement of the A-pillar 81, of the B-pillar 82 and also of the C-pillar 83 has been represented schematically, at least for the left half of the vehicle. The pillars 81-83 are vehicle geometries that are invariable. The pillars 81-83 can be captured by means of the passenger-compartment camera 40.

With the aid of the infrared sensor 60, the spacing between the passenger-compartment camera 40 and the invariable vehicle geometry—for instance, the spacing between the passenger-compartment camera 40 and the A-pillar 81 and/or the B-pillar 82 and/or the C-pillar 83—can be captured. Such a capturing of the spacing is preferentially undertaken in a calibration step which is preferentially carried out once in vehicle-specific manner upon completion of the vehicle 10.

It can be discerned that the passenger-compartment camera 40 is arranged on the central axis M of the vehicle 10. It is possible that the passenger-compartment camera 40 is arranged in the region of the vehicle roof or in the region of the windshield root.

When the method is carried out, the capturing of a head outline 70 of the driver 100 is firstly undertaken. The head outline 70 is captured in a lateral representation of the head 65.

When the head outline 70 of the driver 100 is captured, the capturing of the vehicle geometry—that is to say, in the case represented, of the A-pillar 81, of the B-pillar 82 and/or of the C-pillar 83—is undertaken at the same time. Accordingly, the capturing of the head outline 70 is undertaken in relation to at least one of the aforementioned vehicle geometries 81, 82 and 83.

The calculating of the position of the head 65 of the driver 100 follows with the aid of the captured head outline 70 and with the aid of the calibration information captured within the scope of the calibration step. Therefore the precise position of the head 65, inclusive of the depth data, can be calculated. An evaluation is undertaken of the two-dimensional image data of the passenger-compartment camera 40.

In a step c) the determining is undertaken of a target position of the vehicle mirrors 20 and 25 and also of the screen 30. The determining of the target positions is undertaken with the aid of the calculated head position.

Subsequently, the activating is undertaken of, in each instance, an actuator of the rear-view mirrors 20 and 25 and also of the screen 30. This serves for bringing about the determined target positions of the vehicle mirrors 20 and 25 and also of the screen 30.

Figure 2:
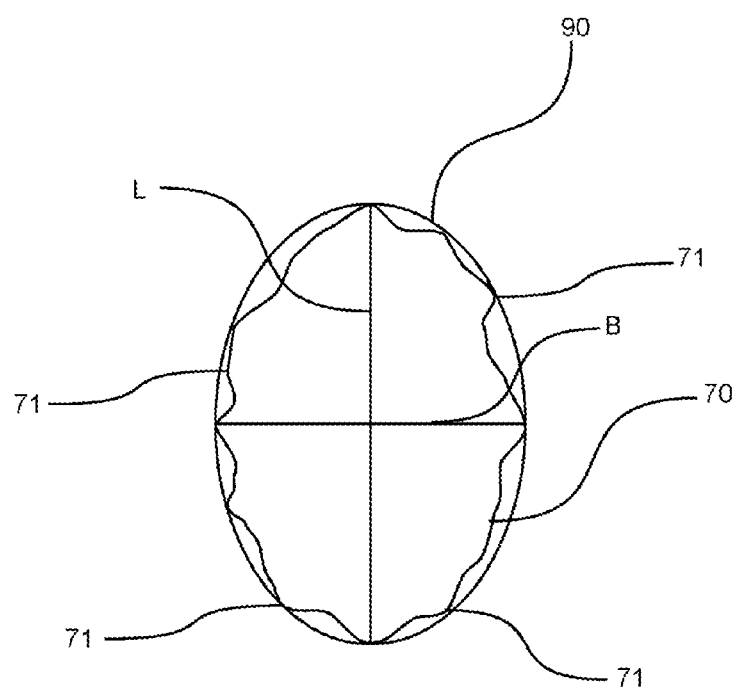
FIG. 2 shows a representation of a method step of the method according to the invention for adjusting at least one vehicle mirror and/or a screen.

FIG. 2 shows how an elliptical shape 90 comes about in respect of the captured head outline 70. Accordingly, an ellipse 90 is placed around the head outline 70 in such a manner that the elliptical shape 90 adjoins as many detected edge portions 71 of the head outline 70 as possible.

In step c) a previously established value as regards a head length L and a head width B is preferentially drawn upon for the purpose of determining the target position of the vehicle mirror 20, 25 and/or of the screen 30. This is undertaken, in particular, by taking the elliptical shape 90 into account.

Figure 3:
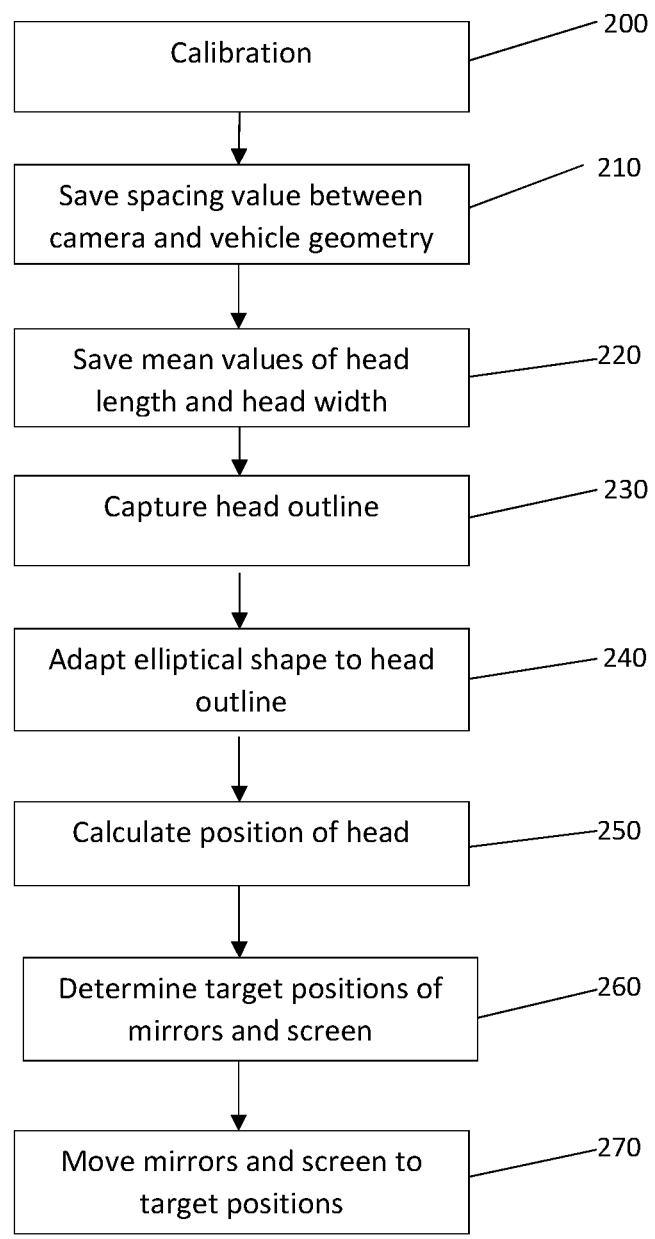
FIG. 3 shows a flowchart of a method according to the invention for adjusting at least one vehicle mirror and/or a screen.

In FIG. 3, individual steps of the method for adjusting at least one vehicle mirror and/or a screen, to be carried out in succession, have been represented in simplified form.

In a step 200 a calibration step is firstly undertaken, in which the spacing between the passenger-compartment camera 40 and at least one vehicle geometry 81, 82 and 83 is ascertained by means of the infrared sensor 60. In step 210 the respective value of the spacing between the passenger-compartment camera 40 and the vehicle geometry is saved in a memory.

In step 220 the mean value as regards the head length L and the head width B is additionally saved in the memory. Steps 210 and 220 may also be carried out simultaneously or in reverse order.

In step 230 the capturing is undertaken of the head outline 70 of the driver 100 in relation to the vehicle geometry 81, 82 and 83 of the passenger compartment 95 of the vehicle. The capturing is undertaken by means of the passenger-compartment camera 40.

In step 240 the adapting of an elliptical shape 90 to the captured head outline 70 is undertaken (see FIG. 2).

It is possible that the head outline 70 of the driver 100 is captured several times in step 230. Accordingly, in step 240 the adapting of an elliptical shape 90 to a mean value of the captured head outlines 70 would have to be undertaken.

In step 250 the calculating of the position of the head 70 of the driver 100 is undertaken with the aid of the captured head outlines 70, in particular by taking the elliptical shape 90 into account. The calculation step 250 is undertaken additionally with the aid of the calibration data captured in step 200 and stored in step 210. The spacing of the head outline 70 of the positioned head 65 of the driver 100 from the passenger-compartment camera 40 can be ascertained with the aid of the calibration data.

In step 260 the target positions of the vehicle mirrors 20, 25 and also of the screen 30 are determined. This can be undertaken, for instance, by means of reference data saved in a database. The reference data are selected on the basis of the calculated head position.

In step 270 the activation of the actuators (not represented) of the vehicle mirrors 20 and 25 and also of the screen 30 is finally undertaken for the purpose of bringing about the previously determined target positions of the vehicle mirrors 20 and 25 and also of the screen 30.

It will be appreciated that the above-describe embodiments are merely illustrative, and that those of ordinary skill in the art may readily devise their own modifications and implementations that incorporate the principles of the present invention and fall within the spirit and scope thereof.

LIST OF REFERENCE SYMBOLS

10 vehicle
20 side mirror
25 interior mirror
30 screen
40 passenger-compartment camera
50 arithmetic unit
60 infrared sensor
65 head
70 head outline
71 edge portion
81 A-pillar
82 B-pillar
83 C-pillar
90 elliptical shape
95 passenger compartment of the vehicle
100 driver
B head width
L head length
M longitudinal axis
200-270 method steps

The invention claimed is:

1. A method for adjusting at least one vehicle mirror and/or a screen, said method including the following steps:
   a) capturing a head outline of a driver in relation to at least one vehicle geometry of the passenger compartment of the vehicle using a passenger-compartment camera of the vehicle,
   b) calculating a position of the head of the driver using, at least in part, the captured head outline and calibration information with respect to the at least one vehicle geometry of the passenger compartment of the vehicle,
   c) determining a target position of the at least one vehicle mirror and/or of the screen using, at least in part, the calculated head position,
   d) activating an actuator of the at least one vehicle mirror and/or of the screen for the purpose of bringing about the determined target position of the vehicle mirror and/or of the screen.

2. The method as claimed in claim 1, wherein the head outline includes a plurality of detected edge portions, the method further comprising adapting of an elliptical shape to the captured head outline such that the elliptical shape adjoins the detected head portions.

3. The method as claimed in claim 2, wherein step a) further comprises capturing the head outline of the driver a plurality of times to generate a plurality of captured head outlines, and wherein step b) further comprises calculating the position of the head of the driver using, at least in part, a mean value of the plurality of captured head outlines of the driver.

4. The method as claimed in claim 3, wherein step c) further comprises using a previously established mean value corresponding to a head length (L) and a head width (B), as well as the adapted elliptical shape, for determining the target position of the vehicle mirror and/or of the screen.

5. The method as claimed in claim 1, wherein step c) further comprises using a previously established mean value corresponding to a head length (L) and a head width (B) for determining the target position of the vehicle mirror and/or of the screen.

6. The method as claimed in claim 1, further comprising:
   capturing, in a calibration step, a spacing between the passenger-compartment camera and the at least one vehicle geometry using a sensor.

7. The method as claimed in claim 6, wherein the sensor comprises an infrared sensor.

8. The method as claimed in claim 6, wherein the at least one vehicle geometry comprises a portion of the A-pillar of the vehicle, and/or a portion of the B-pillar of the vehicle, and/or a portion of the C-pillar of the vehicle.

9. The method as claimed in claim 6, wherein the calibration step is carried out once upon completion of the vehicle or before each adjustment of at least one vehicle mirror.

10. The method as claimed in claim 1, further comprising:
manually measuring, in a calibration step, a spacing between the passenger-compartment camera and the at least one vehicle geometry;
entering and storing the manually measured spacing in an arithmetic unit of the vehicle.

11. A method for adjusting at least one vehicle mirror and/or a screen, said method including the following steps:
a) capturing a head outline of a driver in relation to at least one vehicle geometry of the passenger compartment of the vehicle using a passenger-compartment camera of the vehicle, wherein capturing the head outline of the driver includes capturing the head outline of the driver a plurality of times to generate a plurality of captured head outlines
b) calculating a position of the head of the driver using, at least in part, the captured head outline and calibration information with respect to the at least one vehicle geometry of the passenger compartment of the vehicle, wherein calculating the position of the head of the driver includes using, at least in part, a mean value of the plurality of captured head outlines of the driver
c) determining a target position of the at least one vehicle mirror and/or of the screen using, at least in part, the calculated head position, and
d) activating an actuator of the at least one vehicle mirror and/or of the screen for the purpose of bringing about the determined target position of the vehicle mirror and/or of the screen.

12. A system for adjusting at least one vehicle mirror and/or a screen, comprising:
at least one passenger-compartment camera configured to capture a head outline of a driver in relation to at least one vehicle geometry of the passenger compartment of the vehicle,
at least one arithmetic unit, and
at least one data connection to at least one actuator of a vehicle mirror and/or of a screen;
wherein the at least one arithmetic unit is configured to:
calculate a position of the head of the driver using, at least in part, the captured head outline and calibration information with respect to the at least one vehicle geometry of the passenger compartment of the vehicle,
determine a target position of the at least one vehicle mirror and/or of the screen using, at least in part, the calculated head position, and
cause activation of an actuator of the at least one vehicle mirror and/or of the screen for the purpose of bringing about the determined target position of the vehicle mirror and/or of the screen.

13. The system as claimed in claim 12, wherein the at least one passenger-compartment camera comprises a 2D camera or a fisheye camera.

14. The system as claimed in claim 12, wherein the passenger-compartment camera has an angle of view of 100°-220°.

15. The system as claimed in claim 12, wherein the passenger-compartment camera has an angle of view of 110°-160°.

16. The system as claimed in claim 12, wherein the at least one passenger-compartment camera is arranged on a central axis of a vehicle.

17. The system as claimed in claim 16, wherein
the at least one passenger-compartment camera is arranged in the region of a vehicle roof or windshield root.

18. The system as claimed in claim 12, further comprising a memory in which a mean value as regards a head length and a head width and/or a value of the spacing of the passenger-compartment camera from at least one vehicle geometry of the passenger compartment of the vehicle has been stored, and wherein the at least one passenger-compartment camera is further configured to capture the head outline of the driver a plurality of times to generate a plurality of captured head outlines, and the at least one arithmetic unit is further configured to calculate the position of the head of the driver using, at least in part, a mean value of the plurality of captured head outlines of the driver.

19. The system as claimed in claim 12, further comprising a distance sensor.

20. A non-transitory computer-readable storage medium which contains instructions that cause at least one arithmetic unit to implement a method as claimed in claim 1.

\* \* \* \* \*